No. 717,608. PATENTED JAN. 6, 1903.
L. PAGET.
METHOD OF PREPARING STORAGE BATTERY ELECTRODES.
APPLICATION FILED OCT. 19. 1899.
NO MODEL.
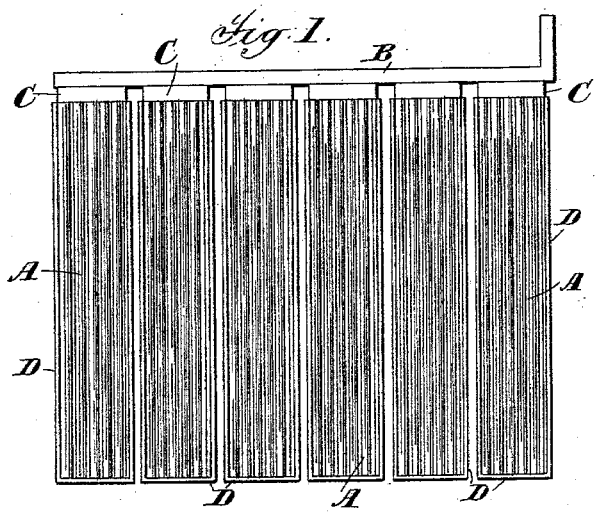
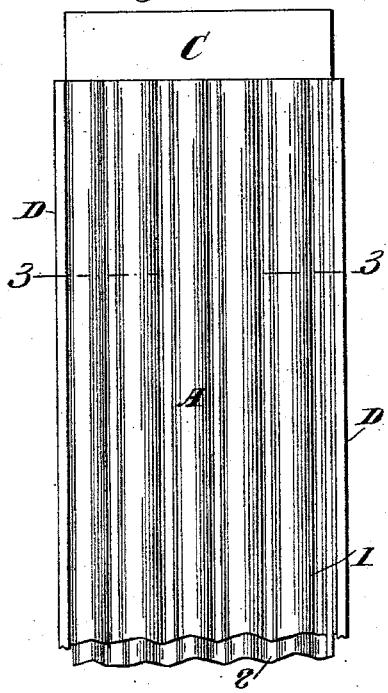
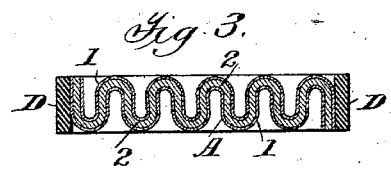
Attest:
Inventor
Leonard Paget
By Philipp Phelps Sawyer
Attys

UNITED STATES PATENT OFFICE.

LEONARD PAGET, OF NEW YORK, N. Y., ASSIGNOR TO CHARLES COSTER, OF NEW YORK, N. Y.

METHOD OF PREPARING STORAGE-BATTERY ELECTRODES.

SPECIFICATION forming part of Letters Patent No. 717,608, dated January 6, 1903.

Application filed October 19, 1899. Serial No. 734,049. (No model.)

*To all whom it may concern:*

Be it known that I, LEONARD PAGET, a citizen of the United States, residing at New York, county of New York, and State of New York, have invented certain new and useful Improvements in Methods of Preparing Storage-Battery Electrodes, fully described and represented in the following specification and the accompanying drawings, forming a part of the same.

This invention relates to storage batteries and methods of preparing electrodes therefor, the object of the invention being to provide an improved battery-electrode which shall possess the advantages of a true Planté plate in respect to rapid charge and discharge, while at the same time avoiding the long period of formation required for producing Planté plates, and which shall be light, strong, and durable under the expansion and contraction occurring in use, present a large surface for action in the battery, and secure a large discharge. I secure this result by a method of making battery-plates consisting of precipitated finely-divided lead, preferably in the form of arborescent crystals of lead, pressed into the form of thin corrugated sheets, preferably inclosed within an elastic non-conducting frame, and which when they are to be used as oxygen electrodes are preferably covered with a thin coating of peroxid of lead; and the invention consists in certain improvements in methods for preparing storage-battery electrodes and plates or other elements for forming the same, all as fully described hereinafter and specifically pointed out in the claims.

For a full understanding of the invention a detailed description of a storage-battery electrode of the preferred form produced by my methods and the process of making the electrode will now be given in connection with the accompanying drawings, forming a part of this specification, in which—

Figure 1 is a side view of a complete electrode or plate formed by combining six small plates to produce an electrode of the size desired. Fig. 2 is a side view, on a larger scale, of one of the small plates forming a portion of the electrode of Fig. 1 and which forms a complete electrode in itself and may be so used. Fig. 3 is a cross-section on the line 3 of Fig. 2.

In Fig. 1 the electrode is shown as formed of a series of small plates A, having the common conductor B passing over the tops of the plates and connecting the conducting-lugs C of the small plates, so that these six small plates A are connected into a single electrode or battery-plate. The lugs C may be soldered to the conductor B or otherwise connected, so as to secure the desired conductivity. Each of the small plates A consists of a thin sheet formed by pressing precipitated lead in the well-known form of the arborescent crystals of lead, which may be obtained by any suitable method of precipitation, either with or without an electric current. This plate is corrugated with the corrugations running vertically or longitudinally of the plate, as shown, and the plate is preferably inclosed on the bottom and edges by an elastic frame D, formed, preferably, of vulcanized soft elastic rubber, so as to permit the plate to expand and contract transversely to the corrugations during the process of charging and discharging the battery, while at the same time holding the corrugated plate in proper form. On the top of the plate A the lug C is formed integral with the plate by hydraulic pressure or otherwise, so as to secure the desired conductivity between the plate A and lug C. A separate lug might be attached to the plate; but such a construction would not be so efficient or durable. Each of the plates A is preferably not over an inch in width, and the best results are secured with even narrower plates, and the thickness of the plates—that is, the depth of the corrugations and of the frame D—is preferably from a quarter to a third of an inch; but this may be varied. The sheets of lead corrugated to form the plates are preferably not more than from one-half to one millimeter in thickness, the use of such thin plates being very desirable, although the thickness may be increased somewhat with fair results. The plates A when combined to form a large plate in the manner shown will be separated a sufficient distance to allow for expansion and contraction and permit the electrolyte to circulate freely between the plates A, as shown in Fig. 1. The plate shown is assumed to be an oxygen electrode, and the lead plate is shown as covered with a thin hard shell 1, of peroxid of lead, deposited upon the precipitated lead 2 and forming a hard shell to hold the precipitated lead together and in proper form. In case of a hydrogen electrode this shell of peroxid of lead will not be used. The process by which this plate is made is as follows: I take precipitated lead, preferably in the form of arborescent crystals, and press this lead into a thin sheet under ordinary screw-pressure, preferably corrugating it at the same time by using a corrugated mold. I then form the conducting-lug on the end of the plate by hydraulic pressure or otherwise. The plate may be used without the elastic frame D, in which case the plate is now ready for use to form a hydrogen electrode, or the elastic frame D may be applied either before or after the conducting-lug is formed. If the plate is to form an oxygen electrode or peroxid plate, I deposit on it, preferably by making it the anode in a nitrate-of-lead solution with a metallic-lead cathode, a thin coating of peroxid of lead, which forms a very hard shell outside the precipitated lead, so as to keep the plate firm and aid in holding the precipitated lead together and in proper form during the forming and charging and discharging operations. I then put the plate in a battery and form it throughout by an electric current of one direction, thus producing practically a solid plate of peroxid of lead. This step of depositing a thin shell of peroxid of lead before electrically forming may be applied also to elements of other forms than plates, the crystals of lead being pressed into bars or rods instead of plates, and this portion of the invention, broadly considered, includes such use of this step. I have found in practice that the shell of peroxid of lead must be deposited before the forming operation, for if an attempt be made to thus deposit peroxid of lead after forming a plate or element of other form the plate will become so hard throughout as to be practically impervious to the action of the electrolyte and not secure efficient action in the battery. This coating with peroxid of lead before forming produces an element in which the electrical action will penetrate the element and secure the highest efficiency, while at the same time the very thin hard shell thus formed secures the requisite stiffness of a plate without a metallic support and with a low specific gravity, so that a thin plate may be used.

My invention provides a plate which will be found to admit of a very rapid charge and discharge, while the plate is electrically formed in manufacture practically at once, no long period of time being required, as in the case of an ordinary Planté plate. The plate also is very light and small for the surface utilized in the battery, and a very large discharge is secured for the size and weight of the battery. The arborescent crystals of the precipitated lead form hooks which lock together firmly under pressure, thus forming a very strong plate, while at the same time retaining the porosity required for the best action of the plate. The corrugated plate provides for expansion and contraction perfectly, especially with the small plates described, which may be combined to form the large plates required in batteries, and it is found in practice that the grooves of the corrugations are not filled up in the operation of the battery, so that the total surface of the plate remains active. While these corrugated plates are preferably used in the form of small plates combined as described to form larger plates, it will be understood that the invention is applicable in connection with making such corrugated plates of any width desired, and large electrodes may be made of a single sheet of such corrugated material. The feature of corrugating is of very great importance and makes possible the practical use of a thin plate of compressed arborescent crystals of lead. This corrugating of the thin plate of active material prevents buckling of the plate by stiffening it and by providing for the taking up of the expansion and contraction by the elasticity resulting from the corrugations, and this prevention of buckling and provision for expansion and contraction prevents the disintegration which must otherwise result in such a plate of active material throughout. With this prevention of buckling, distortion, and disintegration also a large increase in surface is secured. The thin layer of peroxid deposited before forming not only strengthens the plate, but disintegration and oxidation of the active material, with the resulting bad conducting layer which always accompanies these, are wholly avoided, and a conductor over the whole surface of the plate is provided, which secures a better and more complete formation of the plate.

It will be understood that modifications within the scope of the claims may be made in the process described without departing from the invention, and I am not to be limited to the exact details of the process described.

What I claim is—

1. The process of making a plate adapted to form a storage-battery electrode, which consists in pressing finely-divided lead into a thin corrugated plate, substantially as described.

2. The process of making a plate adapted to form a storage-battery electrode, which consists in pressing finely-divided lead into a thin corrugated plate and depositing thereon before forming a thin shell of peroxid of lead and then forming the plate electrically, substantially as described.

3. The method of preparing a storage-battery electrode which consists in pressing finely-divided lead into a thin corrugated plate, and then forming the plate electrically, substantially as described.

4. The method of preparing a storage-battery electrode which consists in pressing finely-divided lead into a thin corrugated plate, depositing thereon a thin shell of peroxid of lead, and subsequently forming the plate electrically into a storage-battery oxygen electrode, substantially as described.

5. The process of making an element adapted to form a storage-battery electrode, which consists in pressing arborescent crystals of lead and depositing on the pressed lead before forming a thin shell of peroxid of lead and then forming the plate electrically, substantially as described.

6. The method of preparing a storage-battery electrode which consists in pressing arborescent crystals of lead, depositing on the pressed lead a thin shell of peroxid of lead, and subsequently forming the plate electrically into a storage-battery oxygen electrode, substantially as described.

In testimony whereof I have hereunto set my hand in the presence of two subscribing witnesses.

LEONARD PAGET.

Witnesses:
T. F. KEHOE,
A. V. BOURKE.